United States Patent [19]
Coleman et al.

[11] Patent Number: 5,602,376
[45] Date of Patent: Feb. 11, 1997

[54] HAND-MOUNTED OPTICAL SCANNER SYSTEM

[75] Inventors: Edward P. Coleman, Rochester; Vincent T. LaManna, Webster; Daniel Bentley, Rochester, all of N.Y.

[73] Assignee: PSC Inc., Webster, N.Y.

[21] Appl. No.: 59,045

[22] Filed: May 7, 1993

[51] Int. Cl.⁶ .................................................... G06K 7/10
[52] U.S. Cl. ........................................ 235/462; 235/472
[58] Field of Search .................................. 235/462, 472

[56] References Cited

U.S. PATENT DOCUMENTS

| | | | |
|---|---|---|---|
| 4,682,015 | 7/1987 | Quan | 235/472 |
| 4,766,299 | 8/1988 | Tierney | 235/472 |
| 4,825,057 | 4/1989 | Swartz | 235/472 |
| 4,955,693 | 9/1990 | Bobba | 350/319 |
| 4,959,810 | 9/1990 | Darbec | 364/900 |
| 4,963,756 | 10/1990 | Quan et al. | 250/568 |
| 5,022,034 | 6/1991 | May | 372/26 |
| 5,047,617 | 9/1991 | Shepard | 235/467 |
| 5,250,790 | 10/1993 | Metlitsky | 235/462 |
| 5,272,324 | 12/1993 | Blevins | 235/462 |

OTHER PUBLICATIONS

Joseph T. Verdeyen, Laser Electronics, Second Edition, published by Prentice Hall, Inc. (New Jersey), PP. 20–21.

*Primary Examiner*—Donald T. Hajec
*Assistant Examiner*—Karl D. Frech
*Attorney, Agent, or Firm*—Joseph F. Murphy, Esq.

[57] ABSTRACT

An optical scanner unit has a window which transmits light from inside the scanner to a target, for example, a bar code, and receives light from a target into the scanner. The window is tilted at Brewster's angle to permit light from inside the scanner to exit the scanner without "exit reflection" of light off the interior of the window. The window also permits light returned from the scanned target to enter the scanner and be sensed by a photodetector therein. The same window may be used for light transmitted to the photodetector and from the light source. The window is disposed at Brewster's angle relative to the scanning beam at the center of scan, and is close to Brewster's angle over the entire scan.

10 Claims, 6 Drawing Sheets

HAND-MOUNTED OPTICAL SCANNER SYSTEM

DESCRIPTION

1. Field of the Invention

The present invention relates to systems for scanning and reading bar codes and other optically discernible symbols and, particularly, to a bar code scanner and reader system which is adapted to be hand-mounted, e.g. worn on the back of the hand.

The invention is especially suitable for providing an integrated hands-free bar code scanner unit which offers high immunity to unwanted specular reflections as are encountered when scanning a glossy or shiny surface. (This is especially useful during triggerless operation, eg. when the scanner is in object-detect mode). The unit is especially suited for use with an exit window which will minimize unwanted back reflections of a laser beam exiting the window.

2. Background and Summary of the Features of the Invention

Laser-scanner based bar code reader systems have been in use for some time. These scanners typically comprise a housing having a laser and associated optics therein. Such a laser and associated optics are, in U.S. Pat. No. 5,200,597, issued to Jay Eastman, et al., on Apr. 6, 1993 and hereby incorporated by reference, integrated together with electronics on a "scan engine" comprising a printed circuit board. The housing is typically a closed structure which supports, among other components, the laser which produces light to scan the target, and the photodetector which receives light returned from the scanned target. Again typically, the housing has at least one optical window. Light from the laser is optically directed to exit this window, and light returned from the scanned bar code enters this window and is directed toward the photodetector. The photodetector should receive only light which is being returned from the target; it must not see the light coming from the laser as this will "bury" the light returned from the bar code.

Unfortunately, in bar code scanners of the prior art, laser light from the laser can reach the photodetector without ever reaching the target. The chief source of this troublesome light is reflection from the exit window. This light due to "exit reflections", i.e. this "exit reflected" light, is reflected back into the interior of the housing, where it raises the ambient light noise level at the photodetector, thus hindering scanner operation.

To reduce the effects of "exit reflection" hand-held bar code scanners of the prior art have tried a number of techniques. Most common is the use of baffles to block light reflected from the window from reaching the photodetector. However, as the photodetector is designed to receive light coming through the window, there must be a clear optical path between the photodetector and the window, and so the baffles cannot block all paths between the window and photodetector—hence baffles cannot block all exit reflections, and are not a complete solution to the problem.

Another solution to the problem of exit reflection in hand-held bar code scanners is discussed in U.S. Pat. Nos. 5,130,520 and 5,103,497, both issued to Shepard, et al. In these patents a two-window design is proposed as a solution. This two window solution, however, increases the size of the devices and also increases difficulty in design and operation.

Another patent dealing with counter-mounted scanners, e.g. such as seen in grocery stores, is U.S. Pat. No. 4,955,693, issued to Bobba. Bobba teaches a window whose under-counter surfaces are bent so as to refract the outgoing beams better and thereby increase scanner volume, i.e. the area above the scanner where an object may be read. Bobba, however, did not address the problem of internal reflections, but merely mentioned Brewster's angle in the opposite context of the present, e.g. he mentioned it as something to avoid as a cause of reflection (as occurs when light is incident at [above/below] Brewster's angle), not as something to aid transmission through a window.

The present invention has as a principal object to prevent the undesired "exit reflections", and is able to do so without the need for extensive baffling and without the need for additional separate windows. The present invention uses an exit window which is disposed at Brewster's angle relative to the optical axis of the scanning beam (the axis from the laser to the code at a point along the scanning path, e.g. at the center of the scan.) so as to essentially eliminate "exit reflections."

Another feature of the present invention is its use of polarizing filters in the optical path, e.g. between the photodetector and the window, in order to prevent specular reflections from blinding/overloading a photodetector.

Briefly described, the invention provides an optical scanner unit with a window which is optimum for both transmitting therethrough light from inside the scanner to a target (e.g., a bar code) and for receiving therethrough light received from a target into the scanner. The window is tilted at Brewster's angle to permit light from inside the scanner to exit the laser scanner without "exit reflection" of light off the interior of the window; the window also permits light returned from the scanned target to enter the scanner and be sensed by a photodetector therein. The same window may be used for light transmitted to the photodetector and from the light source, the laser. The window is disposed at Brewster's angle relative to the scanning beam at the center of scan, and is close to Brewster's angle over the entire scan.

The light source preferably used in connection with the present invention is selected to have a preferred polarization, such as vertical or p-type linear polarization. This laser diode produces a vertically polarized beam which is directed to the exit window, and through the exit window out the front of the scanner. Since the exit window is carefully configured to be at Brewster's angle with respect to the optical axis of the laser beam at the center of the scan, thus the beam is totally transmitted (without substantial decrease in intensity) through the window.

The beam is scanned across a target (e.g., the bar code), which both scatters and specularly reflects the light from its bars and spaces, thereby representing bar code information in both scattered light and the specularly reflected light. Both the specularly reflected light and the scattered light are returned to the scanner through the exit window; both are directed towards the photodetector.

According to the present invention, a polarizing filter is placed in front of the photodetector and is oriented as a vertical polarizer (i.e., with the same direction of polarization as the transmitted light). This filter attenuates light which is polarized in the vertical direction. Since the light which is specularly reflected from a bar code is largely vertically polarized, polarizer filter will attenuate this light before it enters the detector. At the same time, the polarizer filter does not substantially attenuate light which is not vertically polarized, e.g. light returned by scattering from the bar code. This scattered light enters the photodetector and is sensed therein. Thus, although the polarizer (polarizing filter) lowers the level of the signal into the photodetector, it still improves the signal to noise ratio and contrast and hence improves bar code scanner performance. The polarizing filter is especially suited to prevent light reflected off of optical surfaces and the scan engine housing and components from entering the detector at any time, and especially when the laser is in pulsed/object-detect or triggerless mode, and to prevent saturation of the detection system which occurs when reading bar code on reflecting surfaces, such as on metals, e.g. on a soft drink can.

The filter also blocks from the photodetector any other laser light which had not reached the target, e.g. light scattered from the optics inside the unit, or light reflected from any surface inside the scanner. Thus, the filter aids performance in this regard.

The housing according to the present invention has a number of advantages in construction and operation. It utilizes a snap-together construction which may facilitate assembly and disassembly, and which may lend ready modular adaptability to the device, such that it can be integrated with other equipment..

Thus the invention provides an improved optical scanner system which enhances the contrast between bars and spaces of a bar code, increases optical transmitted power output, decreases undesirable reflections of optical transmitted light exiting the scanner, thereby providing improved bar code reading performance.

DETAILED DESCRIPTION

Referring first to FIGS. 1–4, there is shown a portable bar code scanner and reader. A housing 10 contains the electronics and optics of the unit. It is a bi-part shell having front 12 and rear 14 portions which are assembled together along a parting plane 16 where the portions interconnect. The top of the interconnection is at a screwhead-like structure 20; this supports a beam attenuator 22 therebelow such that screwhead-like structure 20 may be rotated to rotate attenuator 22 into position and thereby occlude (by blocking or reflecting) the beam. (Attenuator 22, when used to occlude the beam, also physically pushes the scan mirror (discussed below) to an angle such that a laser light could not be directed by it out of the scanner window.)

Housing 10 has in its front portion 12 a front end portion 18 which has an opening in which a window 24 is disposed. The window 24 is a glass or transparent plastic plate. The scanning beam 23 is projected out of this window 24 towards the code to be read. The front end portion 18 also has an indentation 26 upon which a label (not shown for clarity) may be placed, either upon the outside of the lower portion of window 24, or inside the window. Similar indentations or recesses may be found at 28 and 30 (on both the right and left sides of the unit; although only the right side is displayed the left side is understood to be symmetrical in appearance.) Label recess 30 enables a label to be placed over lock tabs 32; this aids in preventing electro-static discharge (ESD); this, in conjunction with the overall close-fitting nature of the housing, cooperates in preventing ESD damage to the scanner. The labels may also cover the tabs to prevent accidental depression thereof. Lock tabs 32 are essentially barbed in nature; upon depression the front portion and back portions may be separated. Label recess 34 is similarly found atop housing 10, there to display a label (not shown for clarity). Cable 36 is seen leaving the unit in FIG. 1. The appearance of the scanner is a feature of a design patent filed May 4, 1993, Ser. No. 29/007,916, in the name of LaManna, et al and assigned to the assignee of this application. The trigger jack is convertible to an optional replaceable back providing a handle for the scanning unit so that the unit can be carried and actuated as a gun.

Figure 1:
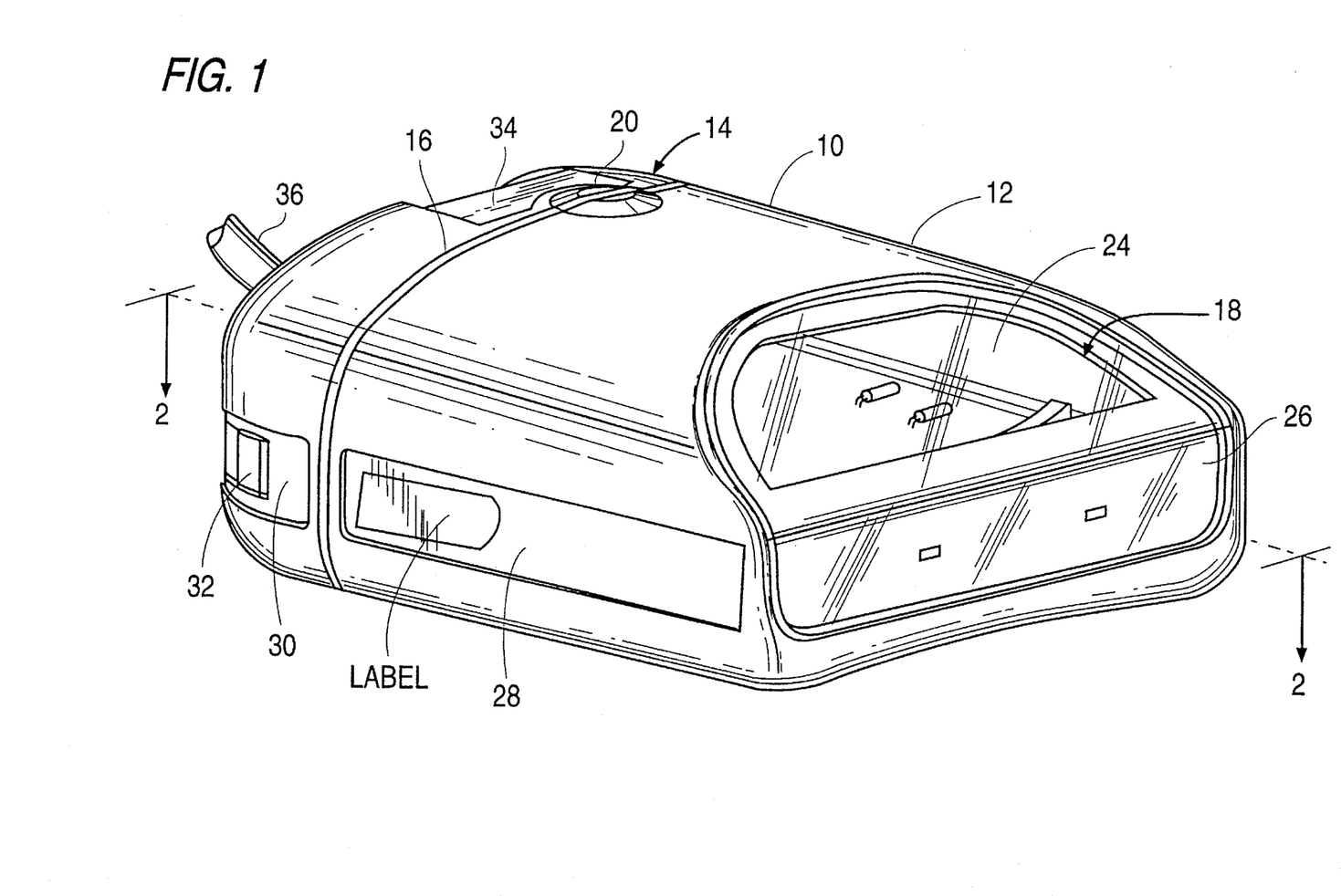
FIG. 1 is a perspective view of a bar code scanner and reader system in accordance with a presently preferred embodiment of the invention.
Figure 1A:
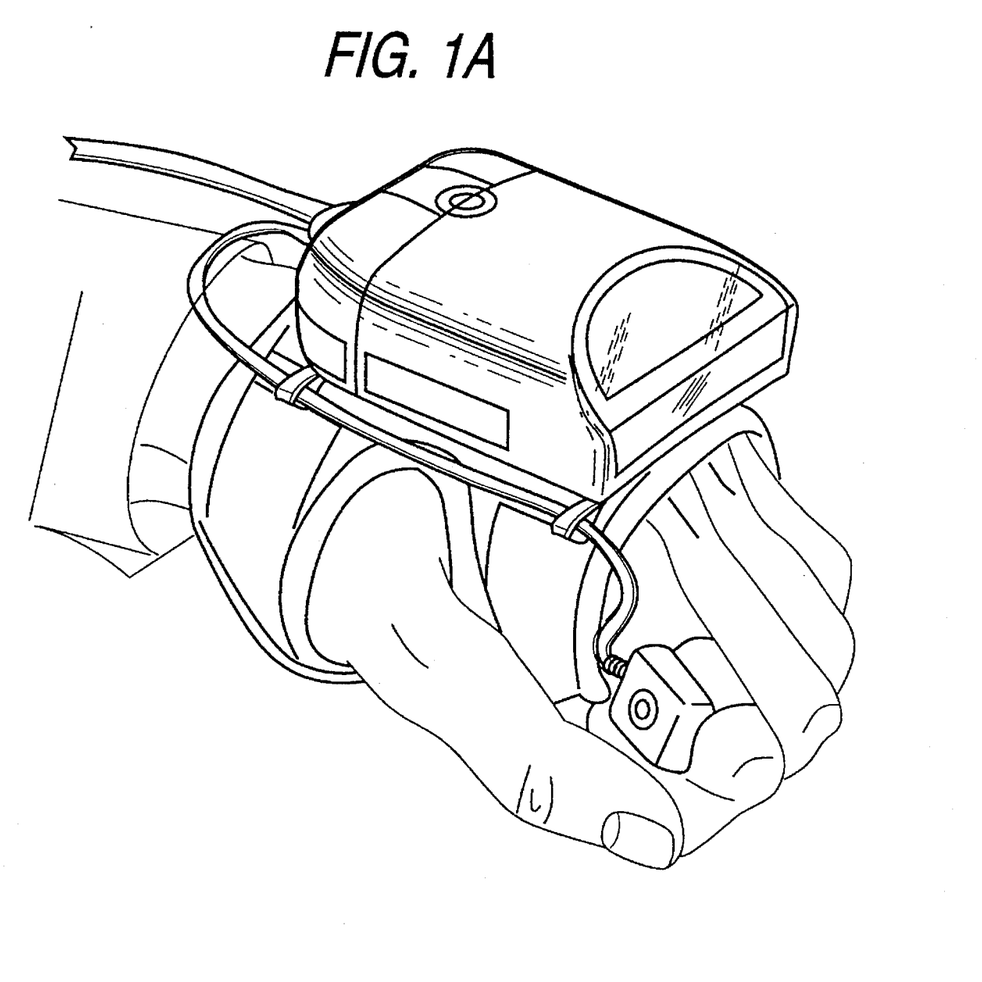
FIG. 1A shows a view of the scanning unit mounted on the back of a hand.
Figure 2:
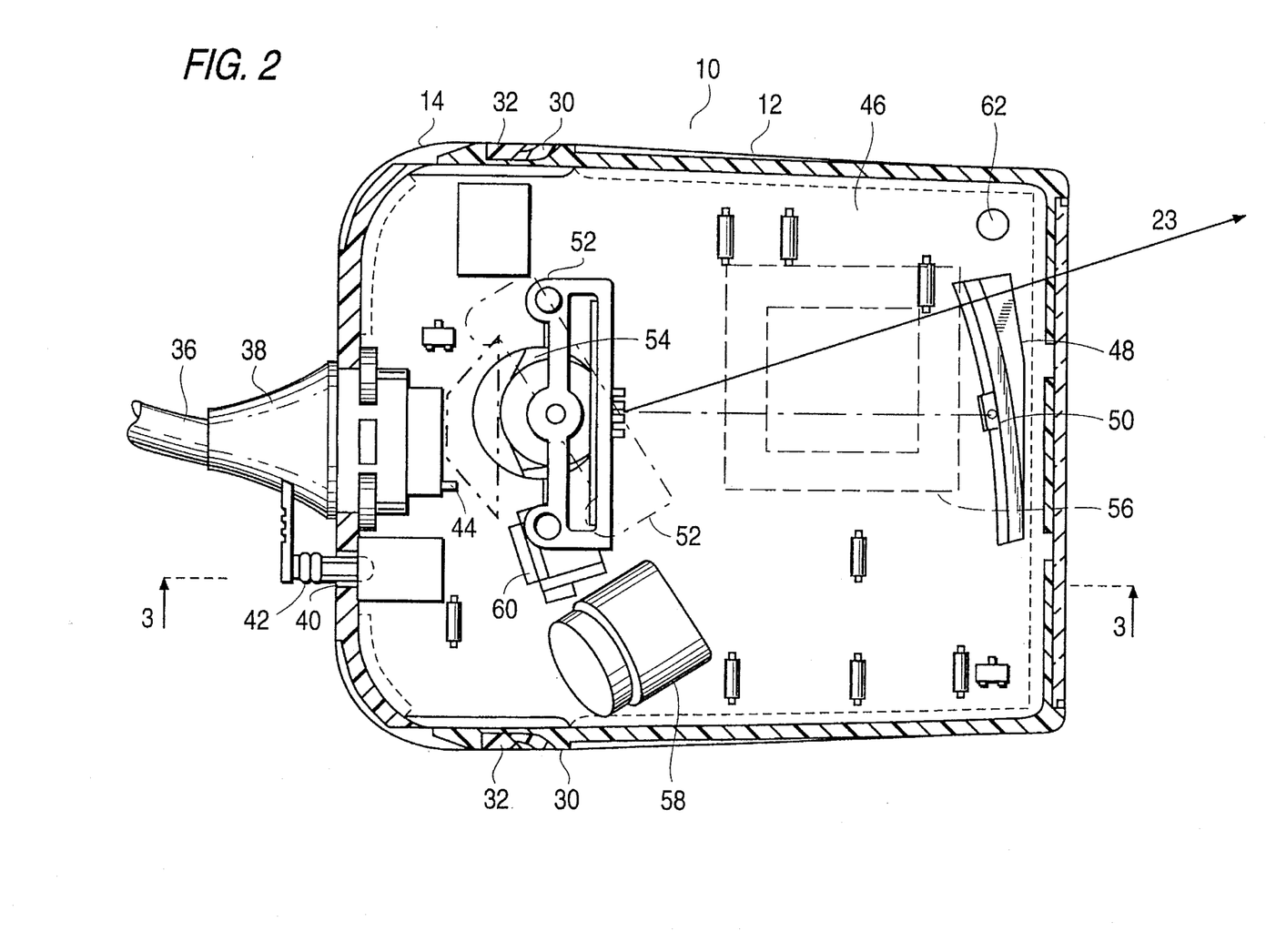
FIG. 2 is a sectional view taken along line 2—2 in FIG. 1.

FIG. 2 shows that cable 36 joins housing back portion 12 at a strain relief 38. Adjacent the cable 36 at strain relief 38 is a female jack 40, shown plugged with plug 42. Female jack 40 may accommodate a connection to external control/power apparatus, such as a plug of a trigger switch. When no such external switch is connected, however, female jack 40 is plugged as shown. Note that in the presently preferred embodiment this plug 42 is connected to strain relief 38; indeed it may be integral therewith.

Cable 36 connects to connector 44, located on a printed circuit board on which the optical and electronic components of the unit are mounted (called an optoelectronic board 46). Optoelectronic board 46 is two sided, and has components mounted on both sides. Visible in FIG. 2 are collection mirror 48, deflection mirror 50, scan mirror 52, motor 54, microprocessor 56 (shown in dotted lines as it is on the board bottom). Also shown are laser assembly 58, from which laser beam 23 emanates, and photodetector 60, which will receive the light returned from the target. Attached to the front of photodetector 60 is polarizing filter 61.

A magnetic sensing switch 62 is shown on board in FIG. 2; this may operate in conjunction with or in lieu of any switch plugged into external jack 40. Ideally, magnetic switch 62 will be of a type previously disclosed in co-pending application entitled "Non-Contact Actuated Trigger Apparatus for Bar Code Laser Scanner" filed Apr. 02, 1993, which is assigned to the present assignee.

Figure 3:
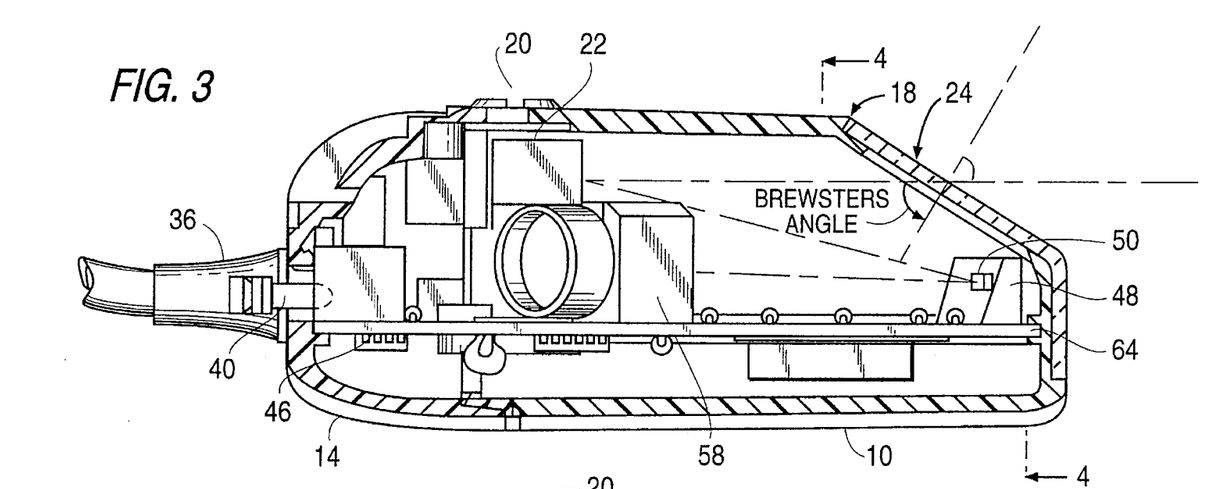
FIG. 3 is a sectional view taken along line 3—3 in FIG. 1.
Figure 4:
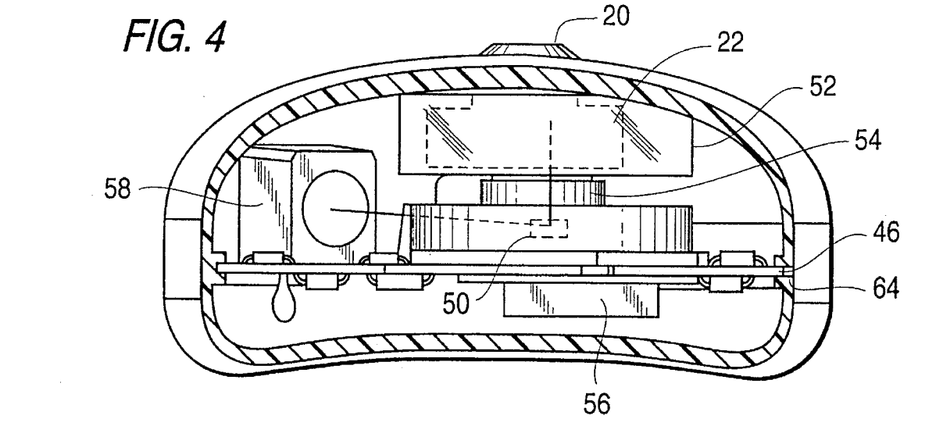
FIG. 4 is a sectional view taken along line 4—4 in FIG. 3.

FIGS. 3 and 4 show different sectional views, but both show the components under the optoelectronic board 46, including microprocessor 56, as well as many components previously discussed. These FIGS. also show the spring fingers inside grooves 64.

Figure 5:
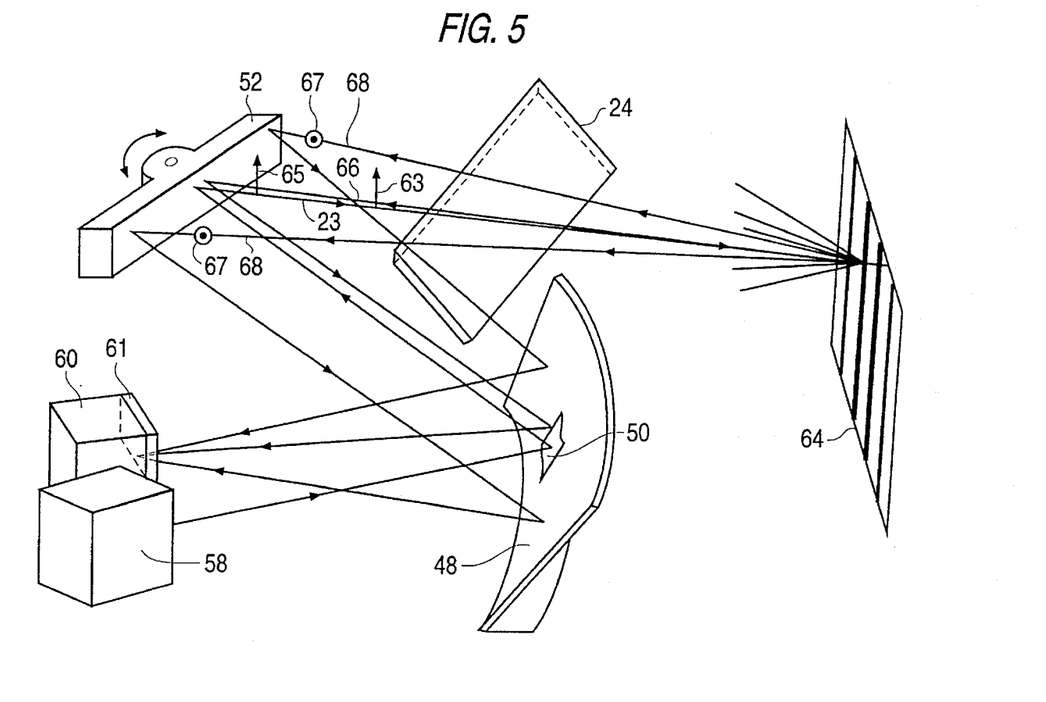
FIG. 5 is a diagrammatic view of the optical path, including rays, of the bar code scanner and reader system of FIG. 1.
Figure 6:
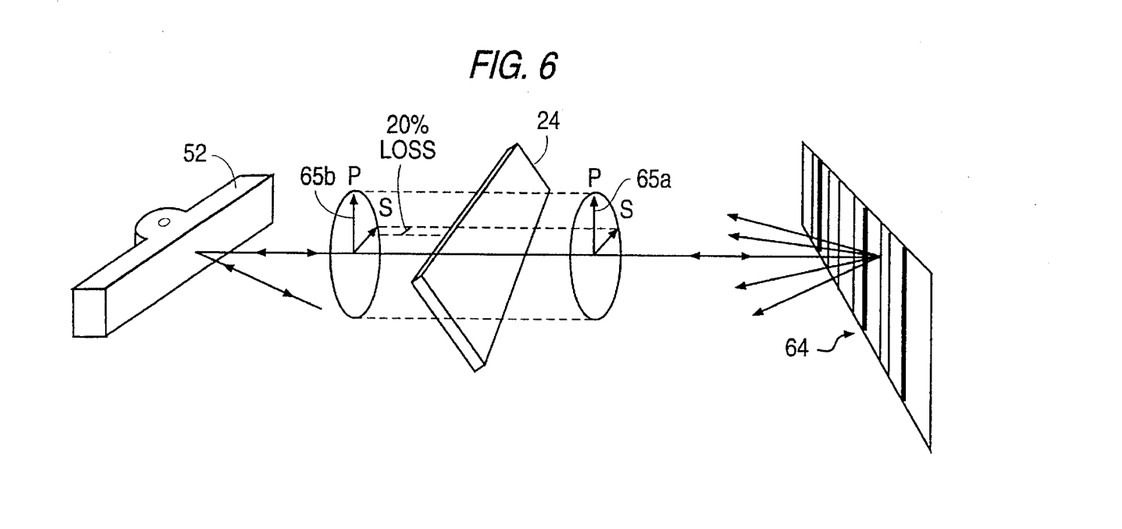
FIG. 6 is a another diagrammatic view of the optical path, including rays, of the bar code scanner and reader system of FIG. 1.

The operation of the presently preferred embodiment will become further apparent from FIG. 5, which illustrates in further detail the polarization state of the light at various points in the circuit and by arrows 65 and 65b in FIG. 6.

Laser beam 23, due to selected operation of the laser, is vertically polarized, as represented by the up and down arrow 65 in FIG. 5. This light is scanned across target 64 by the oscillating motions of mirror 52. Of the outgoing light 23 incident on target 64, some is absorbed, and the rest is returned from the target. there are two principal mechanisms for returned light: specular reflection and scattering. The specularly reflected light is shown in FIG. 5 as incoming ray 66; this ray is returned alongside the optical axis of the outgoing ray 23. The light returned is divided into specularly reflected light 66 and scattered light 68. As will be seen below, the specular and scattered light have different polarization characteristics. The rays are for the center of the scan and are along the optical axis of the beam when at center of the scan position.

The specularly reflected light is polarized in the vertical direction owing to its specular reflection as is well known. This is indicated by the up-and-down arrows 63 shown along the returning specularly reflected ray 66.

The scattered light 68 is polarized in random directions, and hence has both a vertically polarized and horizontally polarized component. As the component of interest is the horizontal one, this is indicated by the dot inside a circle, e.g. an arrowhead 67, shown along the returning scattered ray 68. As illustrated in FIG. 6, upon return through the window, 20% of the horizontally polarized light is blocked; however this is a negligible effect.

While both the specularly reflected light and the scattered light have intensities which are modulated in accordance with the pattern of the particular code scanned, and which both—or either—might theoretically be decoded to get data, in actuality the specularly reflected light is too bright for the photodetector, and may "blind" it; indeed, in the case of a bar code printed on a shiny (particularly a metallic) surface, the intensity of the specularly reflected light may wash out the scattered light, thereby resulting in poor or no signal acquisition; however this problem is overcome by the present invention.

It is noted that the rays follow a certain path towards the photodetector, similar to that disclosed in U.S. Pat. No. 5,200,597 referenced above. Upon reaching the photodetector, however, the light encounters a polarizing filter 61. This polarizer (acting as what is sometimes termed an 'analyzer') attenuates the polarizer specularly reflected beam while allowing the non-polarized scattered light from the code to pass. Thus, the photodetector is not blinded by the specularly reflected light, and can detect the intensity modulations of the scattered light, from which signals representing the bar code are obtained.

In accordance with another aspect, the Bar Code Scanner which is useful in the scanner of FIGS. 1–7 is also useful in other scanners for example in the above referenced U.S. Pat. No. 5,210,597. The signals are obtained from the photodetector using methods which are known, such as are disclosed in a pending application Ser. No. 07/832,078 (which has been allowed, and which is commonly owned with the present application and for which the issue fee has been paid such that it will issue on May 11, 1993 as U.S. Pat. No. 5,210,397 to Eastman, et. al), filed Feb. 10, 1992, which is a continuation of Ser. No. 07/518,608, filed on May 3, 1990 (now abandoned). Application Ser. No. 07/832,078, in its entirety, is hereby incorporated by reference.

Thus, the intensity modulations are converted into an analog electrical signal by the photodetector; a derivative of the signal is taken, then digitized to a bar code signal which represents the bar code signal's bars and spaces with highs and lows.. Unfortunately, in practical operation this signal will also contain highs and lows which correspond to noise which has been digitized; this noise, which will result in erroneous bar code decoding, is typified by low amplitude transition spikes which, although not actual bar code signals, are nevertheless interpreted to be bar code signals and are digitized into a spurious bar code signal. This spurious bar code signal will be provided to the decoder, and result in erroneous decode, unless prevented by further circuitry. It is the object of this feature of the invention to correct this problem.

Briefly, this aspect of the invention provides a circuit which comprises a peak detector receiving code representing analogs signals or derivatives thereof, scanner noise filter circuit which comprises a peak detector receiving derivative bar code as input, a low-pass filter which averages the peak levels output by the peak detector; a comparator which compares each instantaneous peak with a certain amplitude level below; the output of this comparator is used to drive a circuit which controls the delivery of the digitized bar code signal and is connected between the digitizer providing the digital bar code signal and the decoder which is to receive that signal. The circuit driven by the comparator enables or inhibits black bar signals in the digital bar code signal from proceeding to the decoder, as commanded by the bar code comparator.

Figure 7:
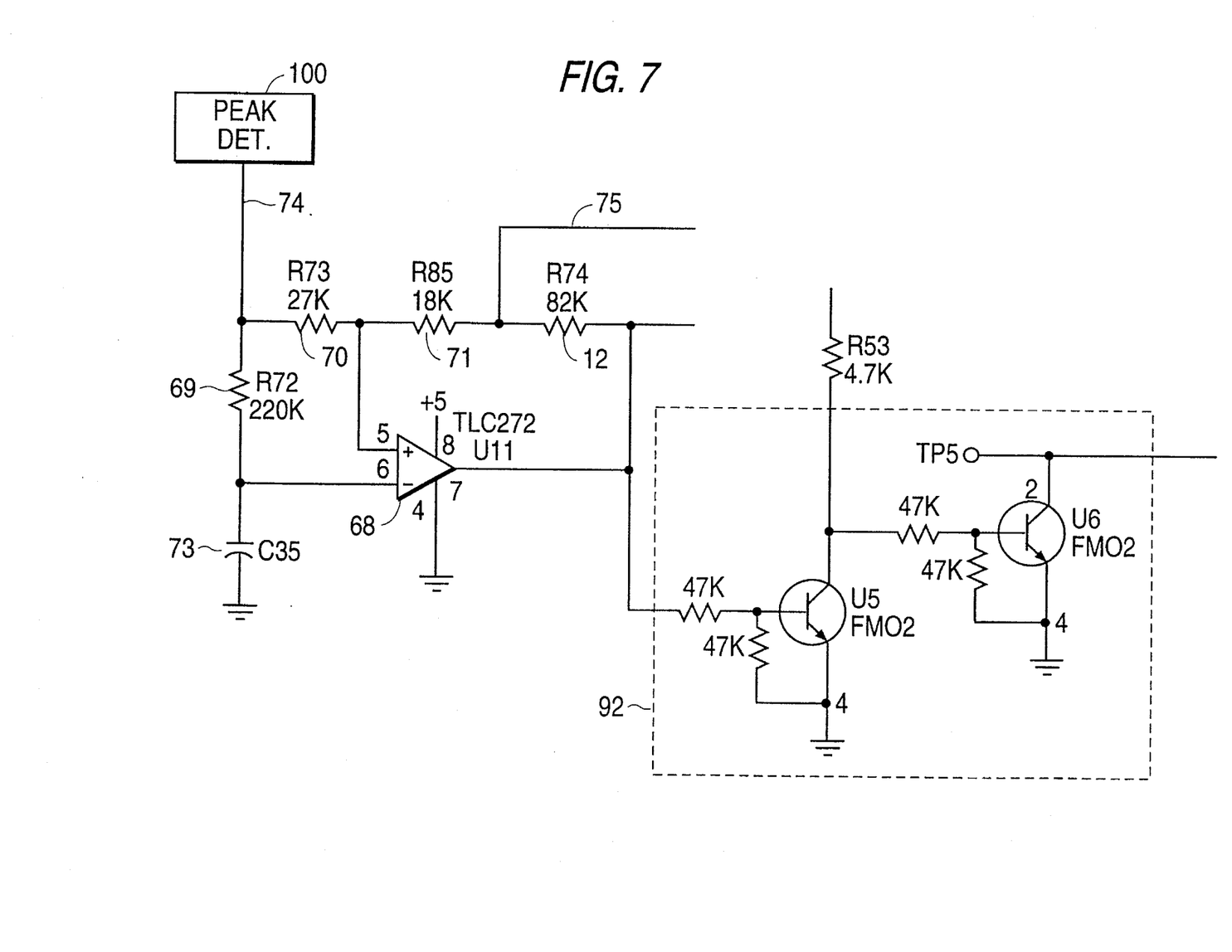
FIG. 7 is a schematic diagram of circuit of the scanner of FIGS. 1–6 and other scanners in accordance with an aspect of this invention.

FIG. 7 which shows a noise filter circuit embodying the invention, which takes as its input a signal from a peak detector 100, which detects the negative peaks of the analog code signal from the derivative (obtained with a differentiator) circuit as described in U.S. Pat. No. 5,210,597, referenced above. These negative peaks correspond to white-to-black transitions of the bar code signal, and vary in amplitude as a function of the contrast. the derivative peak detector output arrives on line 74.

The peak values are averaged by a low-pass filter formed by resistor 69 and capacitor 73. In operative connection with this filter is monolithic operational amplifier 68 and passive components 69–73. The amplifier 68 provides the comparator function.

The averaged peak is used as the threshold for the inverted (pin) 6 on amplifier 68. This averaged peak is compared to a weighted summation of peak detector output 74 and the output of the comparator 68 at pin 7 and a "mode control line" 75" which enables the filter. This weighted summation is provided on pin 5 of 68 which is compared to pin 6 of 68. The comparison results in an output on pin 7 of operational amplifier 68 which assumes a value of four volts when the pin 5 voltage is greater than the pin 6 voltage or zero volts when the pin 5 voltage is less than the pin 6 voltage. Note that the weighted summation will be little affected by the value of mode control line 75 when mode control line 75 is in its transparent state (i.e., its high impedance or tri-state), which it is in when the noise filter is enabled.

Since the signal on pin 5 of 68 is a function of pin 7 on 68, a hysteresis is provided; This hysteresis is settable by varying the resistance components of resistors 71 and 72. By comparing an instantaneous signal 74 with the averaged preceding input signals 74, a peak which is greater than the sum of the average peak plus the hysteresis provided by pin 7 of comparator 68 and resistor network composed of 70, 71 and 72..

Mode control line 75 controls the mode of operation of the bar code noise filter, as follows: When logic zero (e.g., zero volts for an active-high logic) appears on line 75, pin 7 of monolithic operational amplifier 68 is forced to logic low;, which allows bar code signals to proceed to the decoder through a dual transistor pack 92. unaffected by the bar code noise filter. (this is operation in transparent mode) This is extremely important when reading bar code labels when the background noise is of equal contrast with the label being read. After attempting to read pre-processed bar code signals, the bar code noise filter can be disabled after an unsuccessful scan to allow unprocessed bar code signals to proceed to the decoder via dual transistor pack 92 without further processing or attendant delay. Although this requires additional processing by the decoder to find all the bar code signal among all the noise, the bar code will still be detected and read, albeit with an additional processing time.

There are two more modes of interest: To enable the noise filter, the level on 75 must be taken to logic high, followed by transparent mode. This will set the comparator 68 output pin 7 to logic high, and remain latched in this state until the reception of an instantaneous peak signal 74 which is in excess of the sum of the averaged peak signal and the hysteresis determined by resistors 71 and 72.

The third of the three modes is when mode control line 75 is high; this disables all bar code and noise, i.e., all signals, from reaching the decoder.. This is useful when a decoder buffer is full and additional data would cause a data overflow.

The foregoing circuitry, and specifically pin 7 of comparator 68, has yet another important function. It is used to provide an interrupt signal to a microprocessor used to control the scanner. Microprocessor controls the scanner electrically and optically. This interrupt signal may be utilized to initiate a number of subroutines, e.g., such as which monitor various characteristics and attributes of the bar code signal, such as bar and space length, period of signal, and any other characteristics and attributes of interest; similar or different subroutines may be used to perform various ratiometric analyses of the data and tests may be applied to quality or disquality bar code data streams.. The results of such analyses and similar operations upon the data may be used in real time to modify operation of the scanner and particularly the herein described filter and its associated circuitry. In particular, the microprocessor may be used to adjust the optelectronic characteristics of the scanner such as the degree of polarization, intensity of the laser and/or the gain of the signal amplifier.

We claim:

1. A portable code symbol scanner comprising:

a light source for producing a light beam, means for scanning said light beam along a path transverse to an optical axis of said scanner, a window, mounted at Brewster's angle with respect to said optical axis, for transmitting therethrough said light beam to and from said code symbol, and a polarizer positioned to filter said light beam returning from said code symbol and transmitted through said window.

2. The system according to claim one further including a housing having said window mounted in the front thereof and spring finger means inside groove means in said housing to slidably retain an optical assembly printed circuit board therein.

3. The system as claimed in claim 2 wherein said housing is a shell having sections and barbed tabs holding said sections together.

4. The system as claimed in claim 2 wherein labels cover the tabs to prevent accidental depression thereof.

5. A portable hand-mounted scanner unit for scanning an optical beam across a symbol when pointed toward the symbol for reading data represented by the symbol in response to light returned to said unit which comprises:

optical assembly means including a polarized light source for producing the optical beam and means for scanning the beam along a path across the symbol, a photodetector illuminated by said return light, a polarizer positioned in front of said photodetector, and a window which is disposed at Brewster's angle as measured from an optical axis of said optical assembly means, said optical beam being substantially totally transmitted without substantial decrease in intensity at said window, such that the scanning beam going out is effectively totally transmitted out said window.

6. The system as claimed in claim 2 wherein said optical assembly further includes a beam attenuator movable into the optical path to occlude said beam, said beam attenuator, when occluding said beam, also being disposed in engagement with at least one optical element.

7. The system as claimed in claim 2 further including in said unit microprocessor means for controlling said unit electrically and optically.

8. The system as claimed in claim 7, wherein said microprocessor is used to study the light received by said photodetector, and said microprocessor may adjust the optoelectronic characteristics, such as the degree of polarization, intensity of laser, and/or the gain of the signal amplifier.

9. The system according to claim 2 wherein said sources a lazer diode.

10. The system according to claim 2 wherein said housing and said unit are sufficiently small to be mounted on and cover an area no greater than the back of the hand of an adult human operator.

* * * * *